(12) United States Patent
Fanning

(10) Patent No.: US 6,918,001 B2
(45) Date of Patent: Jul. 12, 2005

(54) POINT-TO-POINT BUSING AND ARRANGEMENT

(75) Inventor: Blaise B. Fanning, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 411 days.

(21) Appl. No.: 10/039,302

(22) Filed: Jan. 2, 2002

(65) Prior Publication Data

US 2003/0135682 A1 Jul. 17, 2003

(51) Int. Cl.⁷ ............................................. G06F 13/00
(52) U.S. Cl. ....................................................... 710/316
(58) Field of Search ................................. 710/301–304, 710/316–317

(56) References Cited

U.S. PATENT DOCUMENTS

| | | | | |
|---|---|---|---|---|
| 3,618,031 A | * | 11/1971 | Kennedy et al. ............... | 710/63 |
| 3,725,864 A | * | 4/1973 | Clark et al. ..................... | 710/6 |
| 4,872,160 A | * | 10/1989 | Hemmady et al. .......... | 370/353 |
| 5,001,625 A | * | 3/1991 | Thomas et al. .............. | 710/305 |
| 5,261,059 A | * | 11/1993 | Hedberg et al. ............. | 710/317 |
| 5,303,267 A | * | 4/1994 | Gupta .......................... | 375/260 |
| 5,465,355 A | * | 11/1995 | Cook et al. ................... | 710/38 |
| 5,604,735 A | * | 2/1997 | Levinson et al. ........... | 370/360 |
| 5,675,580 A | * | 10/1997 | Lyon et al. ............ | 370/395.51 |
| 5,729,763 A | * | 3/1998 | Leshem ....................... | 710/38 |
| 5,838,937 A | * | 11/1998 | Lee et al. .................... | 710/316 |
| 6,067,593 A | * | 5/2000 | Schade ......................... | 710/305 |
| 6,105,122 A | * | 8/2000 | Muller et al. ................... | 712/1 |
| 6,138,185 A | * | 10/2000 | Nelson et al. ................ | 710/33 |
| 6,138,187 A | * | 10/2000 | Denning et al. .............. | 710/52 |
| 6,272,552 B1 | * | 8/2001 | Melvin et al. .............. | 709/250 |
| 6,330,639 B1 | | 12/2001 | Fanning et al. | |
| 6,366,983 B1 | * | 4/2002 | Bains .......................... | 711/115 |
| 6,389,494 B1 | * | 5/2002 | Walton et al. .............. | 710/317 |
| 6,426,952 B1 | * | 7/2002 | Francis et al. .............. | 370/380 |
| 6,434,656 B1 | * | 8/2002 | Downer et al. ............. | 710/316 |
| 6,467,031 B1 | | 10/2002 | Fanning | |
| 6,496,894 B1 | | 12/2002 | Fanning | |
| 6,523,092 B1 | | 2/2003 | Fanning | |
| 6,604,186 B1 | | 8/2003 | Fanning | |
| 6,615,308 B1 | | 9/2003 | Fanning | |
| 6,618,777 B1 | * | 9/2003 | Greenfield ................... | 710/120 |
| 6,625,695 B2 | | 9/2003 | Fanning | |
| 6,633,946 B1 | * | 10/2003 | Hendel ....................... | 710/317 |
| 6,650,586 B1 | | 11/2003 | Fanning | |
| 6,675,251 B1 | * | 1/2004 | Streitenberger et al. ..... | 710/306 |
| 6,684,311 B2 | | 1/2004 | Fanning | |
| 6,701,469 B1 | | 3/2004 | Matter et al. | |
| 6,769,046 B2 | * | 7/2004 | Adams et al. .............. | 710/316 |
| 2002/0069352 A1 | | 6/2002 | Fanning | |
| 2002/0073338 A1 | * | 6/2002 | Burrows et al. ............ | 713/201 |
| 2002/0097745 A1 | * | 7/2002 | Brolin et al. ................ | 370/466 |
| 2003/0081558 A1 | | 5/2003 | Fanning | |
| 2003/0084029 A1 | | 5/2003 | Fanning | |
| 2003/0145134 A1 | | 7/2003 | Wehage et al. | |
| 2003/0158992 A1 | | 8/2003 | Ajanovic et al. | |

FOREIGN PATENT DOCUMENTS

EP  707432 A2 * 4/1996 ........... H04Q/11/04

OTHER PUBLICATIONS

U.S. Appl. No. 09/467,106, filed Dec. 10, 1999, Fanning et al. "Method and Apparatus for Pripheral component Interface Bus Speed Selection".

* cited by examiner

*Primary Examiner*—Paul R. Myers
(74) *Attorney, Agent, or Firm*—Jeffrey B. Huter

(57) ABSTRACT

A bus architecture arrangement is provided. Embodiments provide for a point-to-point protocol of a bused system, such as a processor-based system. Further embodiments may comprise a dynamically configurable point-to-point communication array with connectors and/or translators to couple hub devices with endpoint devices. Some of the connectors and/or translators may inductively or magnetically couple endpoint devices to and decouple endpoint devices from point-to-point communication media to facilitate efficient use of a point-to-point communication array.

19 Claims, 4 Drawing Sheets

POINT-TO-POINT BUSING AND ARRANGEMENT

FIELD OF INVENTION

The present invention is in the field of bus architecture. More particularly, the present invention provides a method, apparatus, system, and machine-readable medium for dynamic configuration of a system that uses a point-to-point protocol of a bused system, such as a processor-based system.

BACKGROUND

Multi-drop, parallel bus implementation is close to its practical limits of performance since it may not easily scale up in frequency or down in voltage; its synchronously clocked data transfer is signal skew limited; and the signal routing rules are at the limit for cost-effectiveness. Approaches to push these limits to create a higher bandwidth, general-purpose input-output (I/O) bus result in large cost increases for little performance gain and diverging standards. At the same time, software applications continue to demand more from platform hardware. For example, streaming data from video and audio sources comprise significant amounts of time-dependent data, putting real-time constraints on computer systems, but the multi-drop, parallel bus I/O architecture of these systems are not designed to handle time-dependent data. As a result, the standards for implementing local I/O bus architecture in a computer system, such as a desktop, server, and notebook, are diverging in an attempt to meet the demands of software applications.

Point-to-point busing may provide sufficiently high-speed data transfers but the problems associated with the architecture are significant. Point-to-point busing is expandable to meet the increasing demands of software, such as the time-dependent data. Unlike multi-drop, parallel buses that have protocols to arbitrate ownership of a bus to a device, such as a peripheral component interconnect (PCI) bus protocol, point-to-point buses, or point-to-point communication arrays, have a dedicated communication medium, or dedicated channels of a communication medium, to transfer data. The dedicated communication medium connects two devices at trace points of the communication medium. More specifically, point-to-point communication arrays provide individual connections between an endpoint device and a hub device, such as an I/O device and chipset, switch, or bridge, without any intermediate wire or connector stubs, since wire or connector stubs cause signal reflections. For instance, when signals at 2.5 gigahertz (GHz) are transmitted between the two endpoints of a link and a device is connected to the link between the source and target devices with wire or connector stubs, the impedance of the device introduces signal reflections that interfere with the signal, preventing interpretation of the signal until the reflections attenuate sufficiently.

Dedicating channels to data transfer between two specific components connected at their trace points, however, has drawbacks such as inflexibility and wasted bus resources, or wasted bandwidth. Unlike the competition and arbitration of ownership between devices connected to a multi-drop, parallel bus, devices attached to dedicated channels do not compete for bandwidth. For instance, when a source device is not transmitting data across a dedicated channel to the full extent of the bandwidth for that channel, the unused bandwidth of that channel is wasted because no other device uses the channel. Further, if the device is removed and not replaced by another device, the entire bandwidth of the channel is wasted. As a result, point-to-point communication arrays are also relatively inflexible with respect to changing device connectivity requirements and changing the number of devices connected to the point-to-point communication array.

BRIEF FIGURE DESCRIPTIONS

In the accompanying drawings, like references may indicate similar elements:

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments. The variations of embodiments anticipated for the present invention are too numerous to discuss individually so the detailed descriptions below are designed to make such embodiments obvious to a person of ordinary skill in the art.

Figure 1:
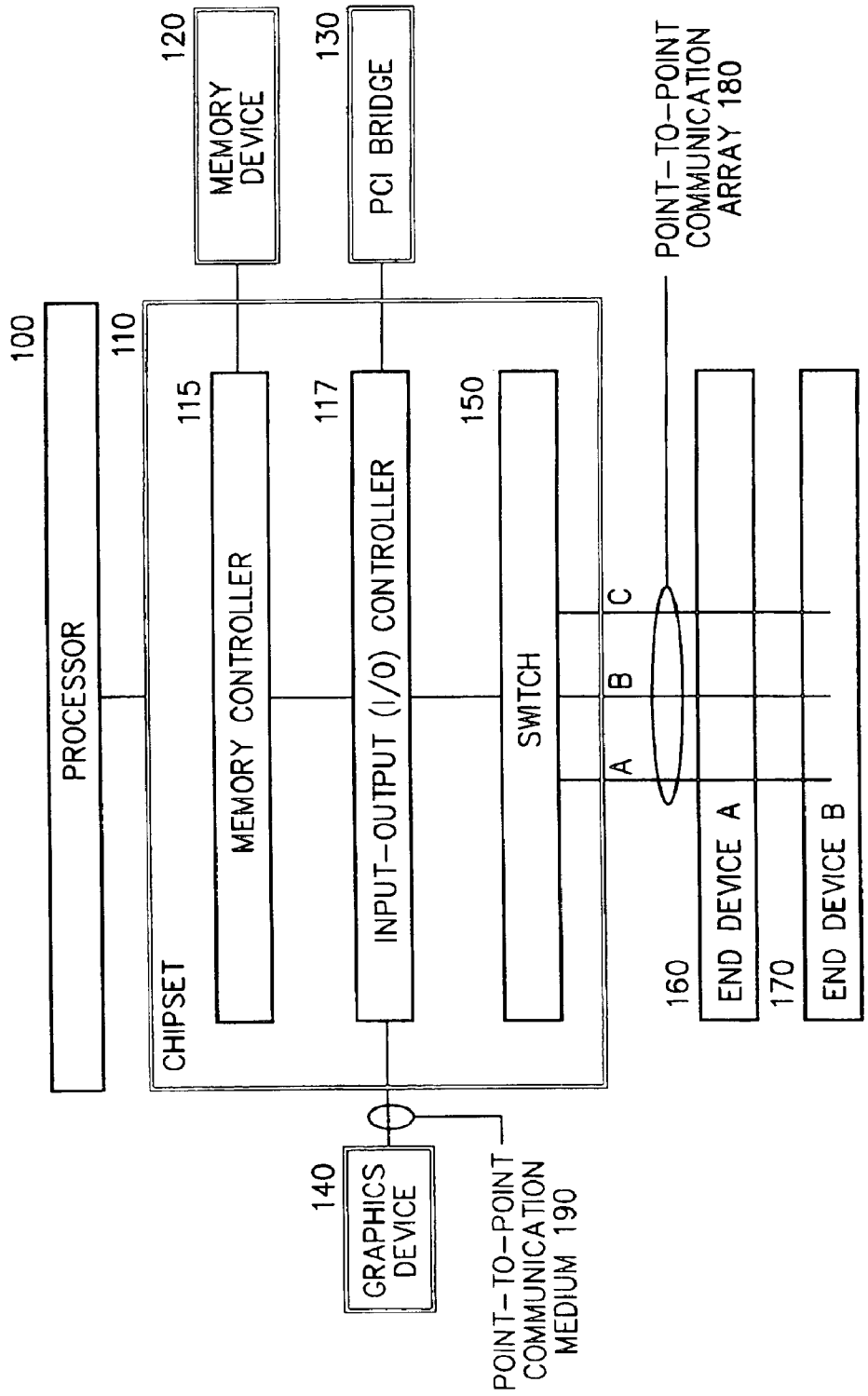
FIG. 1 depicts an embodiment of a system for point-to-point busing.

Referring now to FIG. 1, there is shown an embodiment of a system for point-to-point busing. The embodiment may be a computer system such as a system for a desktop personal computer, notebook computer and/or server. The embodiment comprises a processor 100, chipset 110, memory device 120, peripheral component interconnect (PCI) bridge 130, graphics device 140, point-to-point communication medium 190, point-to-point communication array 180, and endpoint devices 160 and 170. Processor 100 may execute instructions in response to requests from operating system software and application software. Processor 100 may be coupled to chipset 110 to access the contents of memory in memory device 120 and receive data from or transmit data to PCI bridge 130, graphics device 140, and endpoint devices 160 and 170.

Chipset 110 may access memory contents of memory device 120 and relay data and code between processor 100 and input and output (I/O) devices, such as PCI bridge 130, graphics device 140, and endpoint devices 160 and 170. Chipset 110 may comprise a memory controller 115, an input-output controller (I/O controller) 117, and switch 150. Memory controller 115 may be coupled to memory device 120, to access memory contents of memory device 120 in response to instructions from I/O devices and/or processor 100.

In some embodiments, memory controller 115 may be coupled to graphics device 140 via I/O controller 117 and point-to-point communication medium 190 to provide a dedicated high-speed port for a graphics controller. I/O controller 117 may be coupled to graphics device 140 via transaction layer circuitry using a packet-based protocol, data link layer circuitry to verify data integrity, and physical layer circuitry to move data across a data transmission medium. Transaction layer circuitry may condition data to transmit to graphics device 140 by forming packets comprising a header and data and may transmit the packets to the data link layer circuitry. The data link layer circuitry may add a packet sequence number to the packet and add error verification data to the data transmission to facilitate the identification of errors in the data transmission by link layer circuitry of graphics device 140.

The physical layer circuitry linking I/O controller 117 with graphics device 140 may comprise point-to-point communication medium 190. Point-to-point communication medium 190 may comprise lanes to transmit and/or receive data. The lanes may comprise dual-simplex channels implemented as a transmit pair and a receive pair. In some embodiments, the lanes may comprise half-duplex or full-duplex channels. A data clock of the physical layer circuitry may facilitate an $8b/10b$-encoding scheme to maintain a substantially equivalent number of logical ones and logical zeros in the data transmission. In some embodiments, where more than one lane of point-to-point communication medium 190 may transmit data from I/O controller 117 to graphics device 140, data may be disassembled into groups, such as d-words, to substantially optimize data transmission across the point-to-point communication medium 190. Physical layer circuitry of graphics device 140 may reassemble the data in a manner substantially transparent to the data link layer circuitry and transaction layer circuitry.

I/O Controller 117 may also provide access to memory controller 115, memory device 120, processor 100, and graphics device 140, for I/O devices coupled with switch 150 or PCI bridge 130. I/O controller 117 may be coupled with switch 150 and PCI bridge 130 via transaction layer circuitry, data link layer circuitry, and physical layer circuitry, similar to the circuitry coupling memory controller 115 to graphics device 140. Further, I/O controller 117 may comprise circuitry to arbitrate access to a primary I/O bus limited resources, such as access to processor 100, between switch 150 and PCI bridge 130.

Switch 150 may comprise a hub to fan-out from a primary I/O bus. Switch 150 may couple an array of point-to-point communication channels, point-to-point communication array 180, with chipset 110. The point-to-point communication array 180 may comprise point-to-point communication media, A, B and C, to dedicate channels or lanes for data transfer between endpoint devices, 160 and 170, and switch 150. In some embodiments, switch 150 may be designed to provide peer-to-peer communication between the endpoint devices, or I/O devices, coupled with switch 150. For example, end device 160 may transmit data to or receive data from end device 170 via switch 150 without transmitting the data to I/O controller 117 or on to the primary I/O bus.

Switch 150 may comprise logic circuitry to match device connectivity requirements with the connectivity capacity of the point-to-point communication array 180 coupled to switch 150. Logic circuitry of switch 150 may configure the point-to-point communication array 180 during a configuration phase of operation such that devices coupled with the point-to-point communication array 180 may transfer data during a communication phase of operation. In some embodiments, the logic circuitry may comprise software to execute with a general purpose or specific purpose processor, and in other embodiments, the logic circuitry may comprise one or more series of logic gates, a state machine, or the like. The configuration of the point-to-point communication array 180 may be based upon the endpoint devices coupled to the point-to-point communication array at the beginning of the configuration phase of operation. The point-to-point communication array 180 may comprise point-to-point communication media, A, B, and C, that may couple to and decouple from endpoint devices such as endpoint devices 160 and 170. In some embodiments, the endpoint devices may couple to the point-to-point communication array 180 via inductive coupling or electromagnetic coupling.

In the present embodiment, the communication media A, B and C may transfer data at a bandwidth of 2.5 gigabits per second between an endpoint device, such as endpoint device 160 and 170, and switch 150. Logic circuitry of switch 150 may determine the device connectivity requirements and allocate the point-to-point communication media A, B, and C accordingly. For instance, endpoint device 160 may require at least one point-to-point communication medium having transmit and receive channels or lanes to link endpoint device 160 with chipset 110, but may be able to transfer data up to four gigabits per second. On the other hand, endpoint device 170 may require at least one communication channel with chipset 110 and may be able to transfer data at a rate of less than 2.5 gigabits per second.

Logic circuitry of switch 150 may comprise a packet or signal transmitter to determine device connectivity. For example, during the configuration phase of operation, switch 150 may transmit a packet or a signal along point-to-point communication media A, B, and C. Endpoint devices 160 and 170 and/or connectors for endpoint devices may respond to switch 150 with a signal indicating device connectivity.

In some embodiments, endpoint device 160 may be capable of transferring data at a bandwidth of greater than 5 gigabits per second, greater than the bandwidth of two point-to-point communication media, and endpoint device 170 may be capable of transferring data at a bandwidth up to 5 gigabits per second, or up to the bandwidth of two point-to-point communication media. As a result, logic circuitry of switch 150 may determine that the configuration of the point-to-point communication array 180 may dedicate at least one communication medium, A, B, or C, to endpoint device 160 and at least one point-to-point communication medium, A, B, or C, to endpoint device 170. Further, the logic circuitry may determine that endpoint device 160 may have a higher priority to use a second point-to-point communication medium than endpoint device 170. Depending upon the application, the logic circuitry may determine a configuration for the third communication medium of the point-to-point communication array 180 based upon one or more factors such as the type of function or the primary function of an endpoint device; the data transfer bandwidth capability of an endpoint device, the time sensitivity of data transfer for the endpoint device, etc. In many of these embodiments, a priority level determination or scale may be set up to facilitate the dedication of communication media by the logic circuitry.

After the logic circuitry of switch 150 determines a configuration for point-to-point communication array 180 to satisfy device connectivity requirements of endpoint devices 160 and 170, the logic circuitry may configure the point-to-point communication array 180 to dedicate point-to-point communication media, A and B, to data transfer between endpoint device 160 and switch 150, and to dedicate point-to-point communication medium C to data transfer between endpoint device 170 and switch 150

More specifically, during the configuration phase of operation, the logic circuitry may transmit a signal or packet along point-to-point communication media A, B, and C, to instruct endpoint devices 160 and 170, or connectors for endpoint devices 160 and 170 to couple to and/or decouple from the appropriate point-to-point communication media, A, B, and C, according to the configuration. The logic circuitry of switch 150 may instruct endpoint device 160 to couple to communication media A and B and instruct endpoint device 170 to couple to communication medium C. In other embodiments, the logic circuitry may instruct endpoint device 160 to decouple from communication medium C and may instruct endpoint device 170 to decouple from communication media A and B.

During the communication phase of operation, endpoint device 160 may use communication media A and B of the point-to-point communication array 180, to transfer data between endpoint device 160 and switch 150 without competing for access to point-to-point communication medium A or B. In addition, endpoint device 170 may be coupled to communication medium C but may not be coupled to communication medium A or B during communication phase.

Endpoint devices 160 and 170 may comprise connectors to detachably couple endpoint devices 160 and 170 to point-to-point communication media A, B, and C. In some embodiments, endpoint devices 160 and 170 may couple with communication media A, B, and C at the beginning of the configuration phase and receive instructions to decouple from appropriate point-to-point communication media before the communication phase of operation. The connectors may couple with and decouple from a point-to-point communication medium in a manner that may cause little or no reflection in a signal passing through the coupling point. For instance, during the configuration phase of operation, endpoint device 160 may couple with point-to-point communication medium C via a connector. The logic circuitry of switch 150 may determine a configuration for the point-to-point communication array 180 that dedicates point-to-point communication medium C to endpoint device 170. As a result, switch 150 may transmit a signal instructing endpoint device 160 or the connector for endpoint device 160 to decouple from point-to-point communication medium C. During the communication phase, endpoint device 170 may transfer data across point-to-point communication medium C without causing reflections, or causing insubstantial reflections, at the point along point-to-point communication medium C where endpoint device 160 decoupled from point-to-point communication medium C. In some embodiments, an electrical connection scheme may facilitate use of intermediate devices, leaving endpoint device 160 physically coupled to the communication medium. In many of these embodiments, an endpoint device and/or switch may be configured to use an appropriate channel(s) for communication between the endpoint device and switch or to discontinue communication via a channel(s).

In many embodiments, a connector of an endpoint device may comprise inductive coupling to detachably couple an endpoint device, such as endpoint devices 160 and 170, to a point-to-point communication medium. Some of these embodiments may comprise connectors having translators or may couple to translators to translate electrical signals of the endpoint device into magnetic waves to induce an electrical signal on a point-to-point communication medium substantially similar to the electrical signal of the endpoint device. In several of these embodiments, the translator may also translate a magnetic signal resulting from an electrical signal on a point-to-point communication medium into an electrical signal, or optical signal for an endpoint device.

PCI bridge 130 may couple a PCI bus to I/O controller 117. For example, more than one agent on the PCI bus coupled with PCI bridge 130 may request a read of memory contents in memory device 120. PCI bridge 130 may accept one of the requests and forward the request to I/O controller 117 via transaction layer circuitry, data link layer circuitry, and physical layer circuitry. The transaction layer circuitry may condition the read request into packets. Data link layer circuitry may comprise circuitry to check data integrity, by transmitting a data such as an idle character or checksum at the source end of a data transmission and reviewing the data at the target end of the data transmission. After verifying the data transmission, I/O controller 117 may forward the data to memory controller 115 to perform a read access of memory device 120. In some situations, I/O controller 117 may determine that an error has occurred in the data transmission upon receiving the error verification data and request PCI bridge 130 to retransmit the data.

Figure 2:
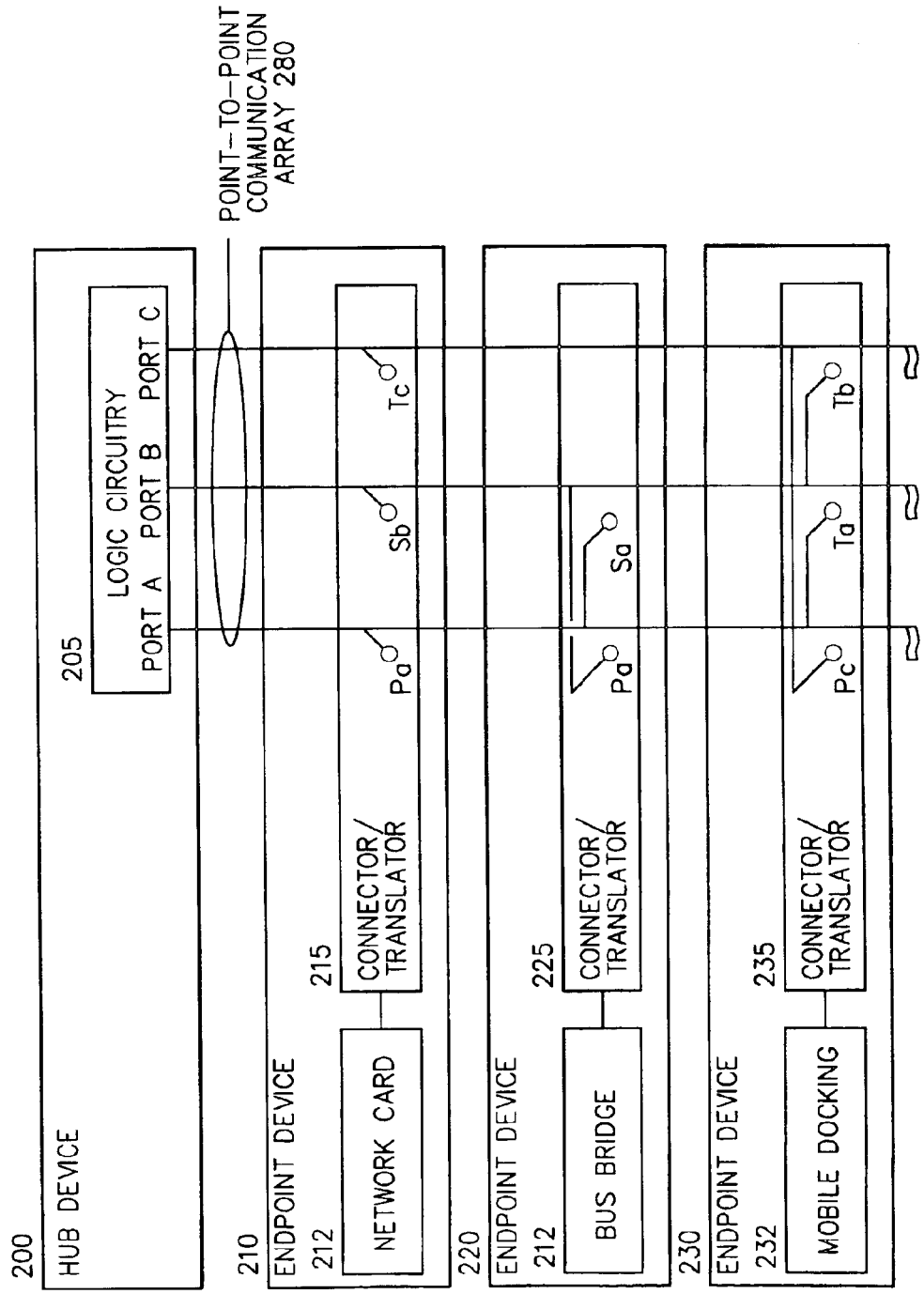
FIG. 2 depicts an embodiment of an apparatus for point-to-point busing.

Referring now to FIG. 2, there is shown an embodiment of an apparatus for point-to-point busing. The embodiment may comprise a hub device 200 coupled with endpoint devices 210, 220, and 230 via an array of point-to-point communication media A, B, and C. Hub device 200 may comprise part of I/O controller 117 or part of switch 150, or hub device 200 may comprise circuitry coupled with I/O controller 117, switch 150, and/or chipset 110 from FIG. 1. Endpoint devices 210, 220, and 230 may comprise I/O devices such as network card 212, bus bridge 222, and mobile docking device 232 coupled with the communication media via connectors 215, 225, and 235, respectively.

In the present embodiment, hub device 200 may comprise a chipset, bridge, switch, etc., and may be designed to configure the point-to-point communication array 280 based upon device connectivity and the connectivity capacity of the point-to-point communication media A, B, and C. Hub device 200 may comprise logic circuitry 205 to determine device connectivity, determine a configuration for the point-to-point communication array 280, and configure the point-to-point communication array 280. Logic circuitry 205 may comprise three I/O ports, ports A, B, and C. Each port A, B, and C may couple with an independent, point-to-point communication medium A, B, or C of the point-to-point communication array 280. Logic circuitry 205 may determine device connectivity and configure interconnections between endpoint devices 210, 220, and 230, and hub device 200 during a configuration phase of operation such that each endpoint device coupled with hub device 200 may have a dedicated point-to-point communication medium A, B, or C.

Endpoint devices 210, 220 and 230 may couple with hub device 200 via point-to-point communication array 280 to transfer data to and from hub device 200. In some embodiments, an endpoint device may transfer data to another endpoint device via hub device 200, such as between endpoint device 210 and endpoint device 220.

Endpoint device 210 may comprise a network card 212 coupled with connector 215 to transfer data between devices on a network, such as a local area network (LAN), and hub device 200. Connector 215 may comprise detachable or non-reflective couplings Pa, Sb, and Tc, to couple network card 212 with port A, port B, and port C of hub device 200 via the point-to-point communication media A, B, and C. In the present embodiment, the detachable coupling Pa represents a primary port for coupling endpoint device 210 to port A of hub device 200. The detachable coupling Sb of endpoint device 210 may represent a non-primary port or secondary port for coupling network card 212 to port B and detachable coupling Tc may represent another non-primary port, or tertiary port, to couple network card 212 to port C. During the configuration phase of operation, such as during a power-up cycle, or recovery from a sleep or other energy saving cycle for a laptop computer, a primary port, such as primary port Pa, may have priority over all other ports coupled to port A of hub device 200 when logic circuitry 205 may determine a configuration for the point-to-point communication array 280. The non-primary ports, such as secondary port Sb and tertiary port Tc, may have second level or second and third level priorities for coupling with ports B and C of hub device 200 respectively. As a result, endpoint device 210, in the present embodiment, has the highest priority for coupling with port A of hub device 200, a secondary priority level to couple with port B of hub device 200, and a tertiary priority level to couple with port C of hub device 200.

Endpoint device 220 may comprise a bus bridge 222 and a connector 225 to couple a bus, such as bus arrangement to maintain compatibility or a relatively low bandwidth bus arrangement, with hub device 200. Connector 225 may comprise a primary port, Pb, coupled with port B of hub device 200, and a secondary port, Sa, coupled with port A of hub device 200 via the point-to-point communication array 280. Endpoint device 220 may comprise a priority for two communication ports since bus bridge 222 may transmit and/or receive data at a bandwidth of less than or equal to the bandwidth of point-to-point communication media A and B coupled to ports A and B, respectively. Endpoint device 220 may comprise a highest priority to couple with port B and a secondary priority to couple with port A.

Endpoint device 230 may comprise mobile docking device 232 coupled with connector 235 to provide a mobile docking port between a mobile device, such as a personal digital assistant (PDA), and hub device 200. Connector 235 may comprise a primary port, Pc, coupled to port C of hub device 200 and two non-primary ports, tertiary port A and tertiary port B. As a result, endpoint device 230 may have a highest priority to couple with port C and tertiary priorities to couple with ports A and B.

Logic circuitry 205 may determine device connectivity based upon signals received upon entering the configuration phase of operation. For example, near the beginning of a configuration phase of operation, endpoint device 210 may transmit a packet via detachable coupling Pa to port A of hub device 200 to indicate that endpoint device 210 comprises a device having a primary port coupled to port A and non-primary ports coupled to ports B and C. In several of these embodiments, the packets may also comprise an indication that endpoint device 210 may have a secondary port coupled to port B and a tertiary port coupled to port C. Endpoint device 220 may transmit a packet via the detachable coupling Pb to port B of hub device 200 to indicate that endpoint device 220 comprises a device having a primary port coupled to port B and a non-primary or secondary port coupled to port A. Endpoint device 230 may transmit a packet indicating that endpoint device 230 comprises a device having a primary port coupled to port C, and non-primary ports or tertiary ports coupled to ports A and B. In some of these embodiments, primary, secondary and/or tertiary ports of an endpoint device may be associated with the connector, such as connectors 215, 225, and 235, that couples the endpoint device to the hub device 200. For example, network card 212 or any other device coupled to connector 215 may comprise a primary port coupled to port A, a secondary port coupled to port B, and a tertiary port coupled to port C. Similarly, in such embodiments, a device coupled to connector 225 may have a primary port coupled to port B and the secondary port coupled to port A, and a device coupled to connector 235 may have a primary port coupled to port C and tertiary ports coupled to ports A and B. In several embodiments, logical circuitry 205 may receive a signal, such as a packet, from empty connectors coupled with the point-to-point communication array 280 to inform logic circuitry 205 of device connectivity.

In other embodiments, logic circuitry 205 may transmit a packet via point-to-point communication media A, B, and/or C upon entering the configuration phase of operation. For example, upon entering the configuration phase of operation, logic circuitry 205 may transmit a packet via port A. In some of these embodiments, when endpoint device 210 comprises a device coupled to connector 215, a response may be transmitted to indicate that endpoint device 210 may claim a primary priority for port A, a secondary priority for port B, and a tertiary priority for port C. In addition, logic circuitry 205 may transmit packets via ports B and C, receiving packets in response from endpoint device 220 via port B and from endpoint device 230 via port C. In many embodiments, when no endpoint device comprises a primary port coupled with port C, for instance, hub device 200 may not receive a response via port C. In several embodiments, when an endpoint device may not comprise a device coupled with a connector, such as network card 232 with connector 225, the hub device 200 may not receive a response via port B. In other embodiments, connectors 215, 225, and 235 may respond to packets from logic circuitry 205 when the connector may have no device connected to the connector, e.g. the connector is unused, and, in further embodiments, connectors 215, 225, and 235 may respond to the packet regardless of whether the connector is coupled with a device. In the latter embodiments, the connector may respond with a signal indicating whether or not the connector may be coupled with a device.

In the present embodiment, logic circuitry 205 may determine that endpoint device 210 comprises a primary priority for port A, endpoint device 220 comprises a primary priority for port B, and endpoint device comprises a primary priority for port C. As a result, logic circuitry 205 may dedicate the point-to-point communication medium A coupled with port A to endpoint device 210, the point-to-point communication medium B coupled with port B to endpoint device 220, and the point-to-point communication medium C coupled with port C to endpoint device 230 for the duration of a subsequent communication phase of operation.

In a subsequent configuration phase, or a reconfiguration phase, for example, bus bridge 222 may be decoupled from connector 225 or endpoint device 220 may be decoupled from the point-to-point communication array 280. In this example, logic circuitry 205 may determine that endpoint device 210 may have the highest priority over ports A and B since the secondary port of endpoint device 210 has a higher priority than tertiary port Tb of endpoint device 230. Logic circuitry 205 may also determine that endpoint device 230 may have priority for point-to-point communication across medium C with port C. As a result, logic circuitry 205 may reconfigure the point-to-point communication array 280 to dedicate data transfer via ports A and B to endpoint device 210 and data transfer via port C to endpoint device 230.

In some embodiments, connectors 215, 225, and 235 may comprise translators. For example, connector 215 may couple network card 212 to port A of hub device 200 via an inductive coupling, Pa. The inductive coupling, Pa, may translate electrical signals, or packets, on the point-to-point communication medium A coupled to port A, into electrical signals decipherable by network card 212. Further, the inductive coupling, Pa, may translate electrical signals, such as packets, from network card 212 into electromagnetic waves to induce an electrical signal on the point-to-point communication medium A.

Figure 3:
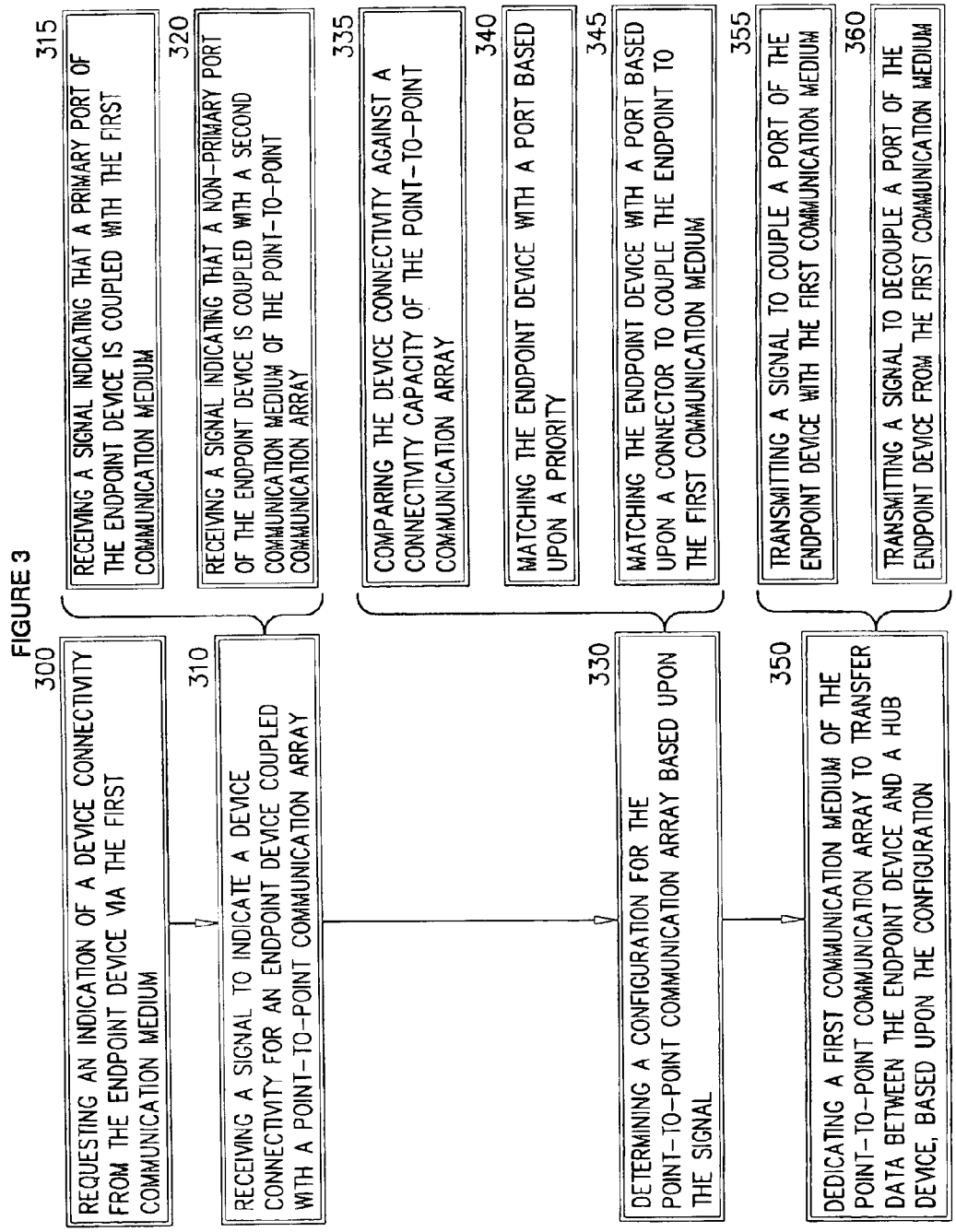
FIG. 3 depicts a flow chart of an embodiment for point-to-point busing.

Referring now to FIG. 3, there is shown a flow chart of an embodiment for point-to-point busing. The embodiment comprises requesting an indication of a device connectivity from the endpoint device via the communication medium 300, receiving a signal to indicate a device connectivity for an endpoint device coupled with a point-to-point communication array 310, determining a configuration for the point-to-point communication array based upon the signal 330; and dedicating a first communication medium of the point-to-point communication array to transfer data between the endpoint device and a hub device, based upon the configuration 350. Requesting an indication of a device connectivity from the endpoint device via the communication medium 300 may request that a device coupled with the point-to-point communication medium transmit a signal indicating device connectivity requirements and/or capabilities. In some embodiments, requesting an indication of a device connectivity from the endpoint device via the communication medium 300 may be designed to request that a connector coupled with the point-to-point communication medium transmit a signal to indicate device connectivity. Requesting an indication of a device connectivity from the endpoint device via the communication medium 300 may comprise transmitting a signal via the point-to-point communication medium. In some embodiments, transmitting a signal via the point-to-point communication medium may comprise transmitting a packet to request that devices and/or connectors respond with a packet indicating device connectivity requirements and/or capabilities.

Receiving a signal to indicate a device connectivity for an endpoint device coupled with a point-to-point communication array 310 may comprise receiving a signal indicating that a primary port of the endpoint device is coupled with the first communication medium 315 and receiving a signal indicating that a non-primary port of the endpoint device is coupled with a second communication medium of the point-to-point communication array 320. Receiving a signal indicating that a primary port of the endpoint device is coupled with the first communication medium 315 may receive a signal during a communication phase of operation indicating that the device has priority over other devices to use the point-to-point communication medium. Receiving a signal indicating that a primary port of the endpoint device is coupled with the first communication medium 315 may also comprise receiving a packet indicating that a primary port of the device is coupled with the point-to-point communication medium.

Receiving a signal indicating that a non-primary port of the device is coupled with a second communication medium of the point-to-point communication array 320 may comprise receiving a packet via the communication medium or the second communication medium indicating that another port of the device is capable of communicating across the second communication medium. In many embodiments, receiving a signal indicating that a non-primary port of the endpoint device is coupled with a second communication medium of the point-to-point communication array 320 may comprise receiving an indication that the device may have a higher bandwidth capability than the communication medium. Receiving a signal indicating that a non-primary port of the endpoint device is coupled with a second communication medium of the point-to-point communication array 320 may comprise receiving a signal indicating a priority for coupling the non-primary port to the second point-to-point communication medium.

Receiving a signal indicating a priority for coupling the non-primary port to the second point-to-point communication medium may comprise receiving a priority such as a secondary or tertiary priority. For instance, an endpoint device may comprise a primary port coupled to port A and port B of a hub device. Port A and port B mat comprise a significant percentage of the bandwidth capability of the hub device. Thus, the endpoint device may only have priority to use a third port, such as port C, when no other device or few other devices are capable of coupling to the communication medium coupled with port C of the hub device.

Determining a configuration for the point-to-point communication array based upon the signal 330 may determine a configuration for the point-to-point communication array to service endpoint devices coupled with the array, based upon device communication requirements and/or capabilities. Determining a configuration for the point-to-point communication array based upon the signal 330 may comprise comparing device connectivity against a connectivity capacity of the point-to-point communication array 335, matching the endpoint device with a port based upon a priority 340, and matching the endpoint device with a port based upon a connector to couple the endpoint to the first communication medium 345. Comparing device connectivity against a connectivity capacity of the point-to-point communication array 335 may comprise comparing the device connectivity capabilities and requirements against other device connectivity capabilities and requirements to determine the ports to dedicate to endpoint devices coupled with the point-to-point communication array. For example, when the device connectivity indicates that a first endpoint device may couple with ports A and B, and that a second endpoint device may couple with ports C and either B or D, logical circuitry may determine a configuration allowing the first endpoint device to couple with ports A and B, and the second endpoint device to couple with ports C and D to make use of the bandwidth capabilities of the point-to-point communication array.

Matching the endpoint device with a port based upon a priority 340 may determine a configuration to dedicate a communication medium to an endpoint device based upon a priority of the endpoint device, a priority of the connector to couple the endpoint device with the communication medium, and/or a priority of another endpoint device capable of coupling with the port via the communication medium. In some embodiments, matching the endpoint device with a port based upon a priority 340 may comprise matching based upon a priority of I/O device, such as a network card, coupled with the connector.

Matching the endpoint device with a port based upon a connector to couple the endpoint to the first communication medium 345 may determine a configuration based upon the connector through which an I/O device may be couple to the communication medium. For example, a busing architecture may comprise a first connector and a second connector. When a network card may couple to the first connector, the network card may be associated with the highest priority for port A of a corresponding hub device. On the other hand, when the same network card may couple to the second connector, the network card may be associated with a non-primary priority to couple with port A and may be associated with a primary priority, or the highest priority, to couple with port B.

Dedicating a first communication medium of the point-to-point communication array to transfer data between the endpoint device and a hub device, based upon the configuration 350 may cause the endpoint devices to couple with the point-to-point communication array according to the configuration. In some embodiments, dedicating a first communication medium of the point-to-point communication array to transfer data between the endpoint device and a hub device, based upon the configuration 350 may comprise dedicating less bandwidth to a device than the device is capable of using or apportioning the point-to-point communication media amongst devices having a combined bandwidth capability near the bandwidth capacity of the point-to-point communication array.

In many embodiments, dedicating a first communication medium of the point-to-point communication array to transfer data between the endpoint device and a hub device, based upon the configuration 350 may comprise transmitting a signal to couple a port of the endpoint device with the first communication medium 355 and transmitting a signal to decouple a port of the endpoint device from the first communication medium 360. Transmitting a signal to couple a port of the endpoint device with the first communication medium 355 may comprise transmitting a packet to an endpoint device to cause a connector of the endpoint device to couple with the communication medium. In some embodiments, the packet may cause the connector of the endpoint device to couple with another communication medium.

Transmitting a signal to decouple a port of the endpoint device from the first communication medium 360 may transmit a packet to cause a connector of an endpoint device to decouple from a port of the hub. For example, in some embodiments, the connectors may initially comprise primary ports coupled with a corresponding communication medium. The primary ports of connectors that may not be coupled with an I/O device, such as a mobile docking station, may be decoupled from the communication medium. In other embodiments, primary and non-primary ports of connectors may be coupled with a communication medium and transmitting a signal to decouple a port of the endpoint device from the first communication medium 360 may decouple non-primary ports of endpoint devices in deference to a primary port or a non-primary port with a higher priority.

Many embodiments further comprise reconfiguring the point-to-point communication array to dedicate the first communication medium to a data transfer between a second endpoint device and the hub device. Reconfiguring the point-to-point communication array to dedicate the first communication medium to a data transfer between a second endpoint device and the hub device may comprise determining a new device connectivity during a subsequent configuration phase of operation and configuring the point-to-point communication array based upon the new device connectivity. In some processor-based systems such as desktop computer systems or notebook computer systems, the configuration phase may occur when the processor-based system is first powered up. In many of these systems, a configuration phase maybe initiated by the operating system. For example, a processor-based system such as a desktop computer system may have a control panel to provide reconfiguration of hot plug-in devices. When a device is plugged in, the processor-based system may halt other activity in the system or activity associated with I/O devices of a hub when reconfiguring a point-to-point communication array coupled to that hub, and the configuration phase after reconfiguring the point-to-point communication array, and resume normal activity upon entering the communication phase of operation.

Figure 4:
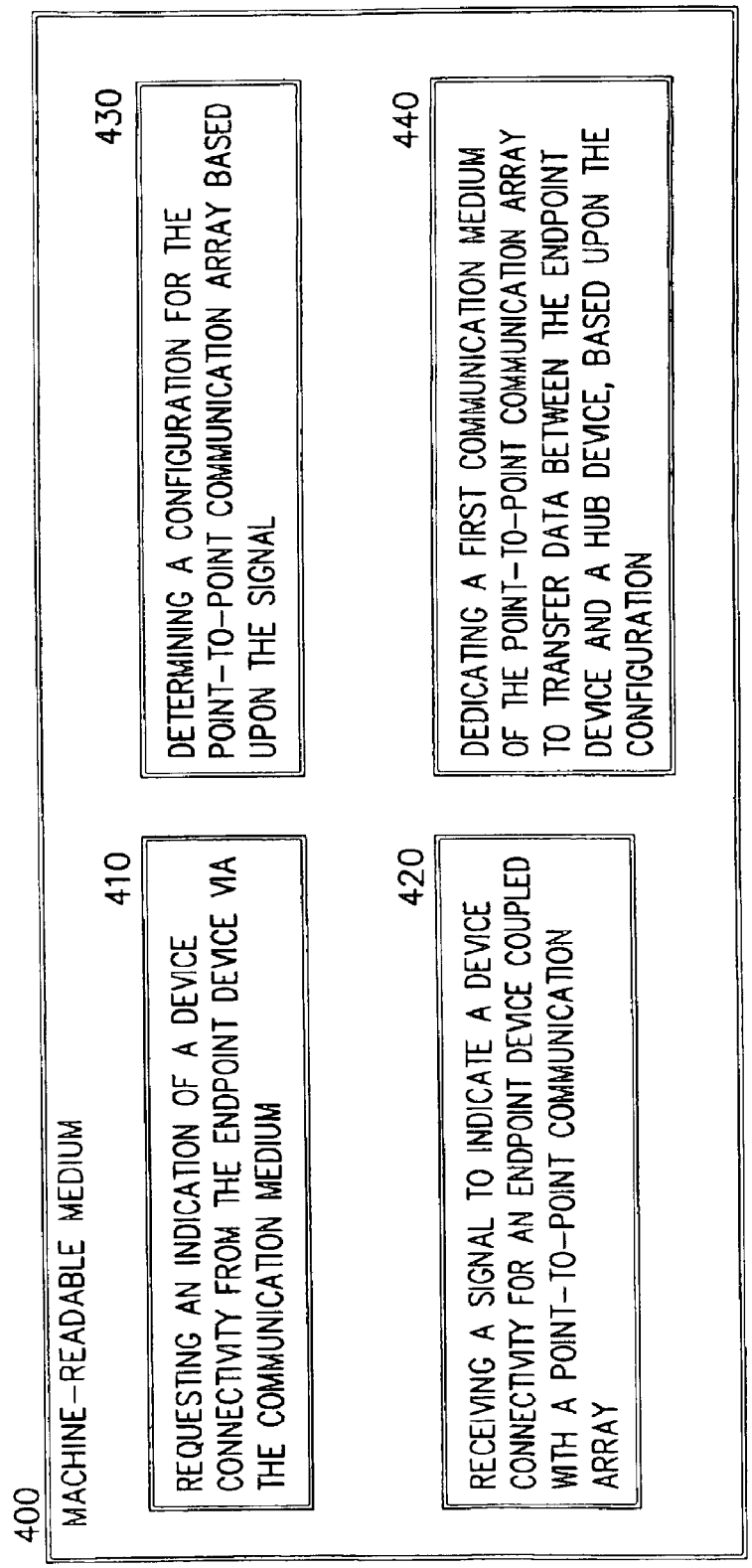
FIG. 4 depicts an embodiment of a machine-readable medium comprising instructions for point-to-point busing.

Referring now to FIG. 4, a machine-readable medium embodiment of the present invention is shown. A machine-readable medium may include any mechanism that provides (i.e. stores and/or transmits) information in a form readable by a machine (e.g., a computer), that when executed by the machine, may perform the functions described herein. For example, a machine-readable medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc. . . . Several embodiments of the present invention may comprise more than one machine-readable medium depending on the design of the machine.

In particular, FIG. 4 shows an embodiment of a machine-readable medium comprising instructions for point-to-point busing. The machine-readable medium 400 may comprise instructions for requesting an indication of a device connectivity from the endpoint device via the communication medium 410, receiving a signal to indicate a device connectivity for an endpoint device coupled with a point-to-point communication array 420, determining a configuration for the point-to-point communication array based upon the signal 430; dedicating a communication medium of the point-to-point communication array to transfer data between an endpoint device and a hub device, based upon the configuration 440; and reconfiguring the point-to-point communication array to dedicate the point-to-point communication medium to data transfer between a second device and the hub device. Requesting an indication of a device connectivity from the endpoint device via the communication medium 410 may comprise instructions for transmitting a signal, such as a packet, configured to elicit a response from a primary port of an endpoint device but may not elicit a response from a non-primary port of an endpoint device. In some embodiments, instructions for requesting an indication of a device connectivity from the endpoint device via the communication medium 410 may comprise instructions to transmit the packet via each port of a hub device coupled with the point-to-point communication array. In several embodiments, the instructions for requesting the signal may comprise instructions for requesting that an endpoint device transmit a signal from more than one port via the point-to-point communication array, and in some of these embodiments, endpoint devices coupled with the point-to-point communication array may be requested to transmit signals at distinct times based upon the primary port of each endpoint device, the type of endpoint device, a function of the endpoint device, or the connector through which each endpoint device may coupled with the point-to-point communication array.

Receiving a signal indicating device connectivity for a device coupled with a point-to-point communication medium of a point-to-point communication array 420 may comprise instructions for receiving a packet from each endpoint device and/or connector coupled with the point-to-point communication array wherein the packet may indicate device connectivity. Receiving a signal indicating device connectivity for a device coupled with a point-to-point communication medium of a point-to-point communication array 420 may also comprise instructions for receiving a pulse from the device via more than one point-to-point communication medium. In other embodiments, instructions for receiving a signal indicating device connectivity for a device coupled with a point-to-point communication medium of a point-to-point communication array 420 may comprise instructions for receiving a bit.

Determining a configuration for the point-to-point communication array based upon the signal 430 may select an endpoint to couple with each port of a hub. In some embodiments, selecting an endpoint device to couple with each port of a hub may comprise instructions for selecting an endpoint device based upon a priority of an I/O device of the endpoint device. In other embodiments, selecting an endpoint device to couple with each port of a hub may comprise instructions for selecting an endpoint device based upon a connector of the endpoint device.

Dedicating a communication medium of the point-to-point communication array to transfer data between an endpoint device and a hub device, based upon the configuration 440 may comprise instructions for initiating a signal directed at a port of a device on each point-to-point communication medium coupled with the hub device to indicate that the point-to-point communication medium may be dedicated to that port of the device. In some embodiments, dedicating a communication medium of the point-to-point communication array to transfer data between an endpoint device and a hub device, based upon the configuration 440 may comprise instructions for transmitting a packet to the primary port of an endpoint device to indicate which point-to-point communication media may be dedicated to that endpoint device. In many embodiments, the instructions may include instructions to transmit a signal to a port of an endpoint device to indicate that the point-to-point communication medium may not be dedicated to that port of the device.

Reconfiguring the point-to-point communication array to dedicate the point-to-point communication medium to data transfer between a second device and the hub device may comprise instructions for halting I/O activity on a point-to-point communication medium to determine a new device connectivity for that point-to-point communication array, to determine a new configuration for the point-to-point communication array based upon the new device connectivity, and to dedicate a point-to-point communication medium of the array to a device according to the new configuration during a configuration phase of operation.

What is claimed is:

1. An apparatus supporting endpoint devices, comprising:
a point-to-point communication array comprising communication media to transfer data with said endpoint devices; and
a hub device coupled with said point-to-point communication array to configure said point-to-point communication array by dedication of a communication medium of said point-to-point communication array to each endpoint device that is coupled to said hub device via the point-to-point communication array, wherein said dedication is based upon device connectivity indications for said endpoint devices, wherein
the endpoint devices are coupled to said communication media of said point-to-point communication array via connectors,
each connector comprises a primary port coupled to said point-to-point communication array and a non-primary port coupled to said point-to-point communication array, and
said hub device dedicates communication media of said point-to-point communication array to primary ports with coupled endpoint devices before dedicating communication media to non-primary ports with coupled endpoint devices.

2. An apparatus, comprising:
a point-to-point communication array to transfer data; and
a hub device, coupled with said point-to-point communication array to configure said point-to-point communication array by dedication of a communication medium of said point-to-point communication array to transfer data between an endpoint device and said hub device based upon device connectivity, wherein
the endpoint device is coupled with said point-to-point communication array via a connector, and
the connector comprises a detachable coupling to decouple the connector from the communication medium in response to a signal from said hub device.

3. The apparatus of claim 2, the detachable coupling comprises an inductive coupling to couple the connector with the communication medium.

4. The apparatus of claim 2, wherein said hub device comprises logic circuitry coupled with said point-to-point communication array to select the endpoint device based upon receipt of a signal to indicate a device connectivity.

5. The apparatus of claim 4, wherein the logic circuitry comprises circuitry to transmit a signal to request a device connectivity.

6. An apparatus, comprising:
a point-to-point communication array to transfer data; and
a hub device, coupled with said point-to-point communication array to configure said point-to-point communication array by dedication of a communication medium of said point-to-point communication array to transfer data between an endpoint device and said hub device based upon device connectivity, wherein
the endpoint device is coupled with said point-to-point communication array via a connector, and
the connector comprises a translator to translate between magnetic and electrical signals.

7. The apparatus of claim 6, wherein said point-to-point communication array comprises a lane to transmit data between the endpoint device and said hub device.

8. The apparatus of claim 7, wherein the lane comprises a selectable lane.

9. The apparatus of claim 6, wherein said hub device comprises circuitry to provide peer-to-peer communication.

10. A machine-readable medium comprising instructions, which when executed by a machine, cause said machine to perform operations, comprising:
receiving signals that indicate device connectivity for endpoint devices coupled with a point-to-point communication array;
dedicating a first communication medium of the point-to-point communication array to transfer data between the endpoint device and a hub device, based upon the signals; and
dedicating, in addition to the first communication medium, a second communication medium of the point-to-point communication array to the first endpoint device.

11. The machine-readable medium of claim 10, wherein the instructions further cause said machine to perform operations, comprising
requesting an indication of device connectivity from the endpoint devices via the first communication medium.

12. A machine-readable medium comprising instructions, which when executed by a machine, cause said machine to perform operations, comprising:
receiving signals that indicate device connectivity for endpoint devices coupled with a point-to-point communication array;
dedicating a first communication medium of the point-to-point communication array to transfer data between the endpoint device and a hub device, based upon the signals; and dedicating a second communication medium of the point-to-point communication array to a second endpoint device.

13. A method, comprising:

receiving indications of device connectivity for endpoint devices coupled with communication media of a point-to-point communication array;

dedicating a first communication medium of the point-to-point communication array to a first endpoint device and a second communication medium of the point-to-point communication array to a second endpoint device, based upon the indications of device connectivity indicating that the first endpoint device and the second endpoint device are coupled to the point-to-point communication array; and dedicating, in addition to the first communication medium, a third communication medium of the point-to-point communication array to the first endpoint device.

14. The method of claim 13 wherein dedicating the third communication array comprises coupling the third communication medium of the point-to-point communication array to the first endpoint device, and decoupling the third communication medium from the second endpoint device.

15. The method of claim 13, further comprising requesting an indication of device connectivity from the endpoint devices via the first communication medium.

16. The method of claim 13, wherein said receiving the indications comprises receiving an indication that a primary port of the first endpoint device is coupled with the first communication medium.

17. The method of claim 13, wherein said receiving the indications comprises receiving an indication indicating that a non-primary port of the first endpoint device is coupled with the second communication medium of the point-to-point communication array.

18. The method of claim 13, wherein said dedicating a first communication medium comprises coupling a port of the first endpoint device with the first communication medium.

19. The method of claim 18, wherein said dedicating a first communication medium comprises decoupling a port of the second endpoint device from the first communication medium.

* * * * *